(12) United States Patent
Ito (10) Patent No.: US 10,093,505 B2
(45) Date of Patent: Oct. 9, 2018

(54) TRANSPORTATION APPARATUS AND PRINTING APPARATUS

(71) Applicant: SEIKO EPSON CORPORATION, Tokyo (JP)

(72) Inventor: Shun Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 15/064,399

(22) Filed: Mar. 8, 2016

(65) Prior Publication Data

US 2016/0272449 A1 Sep. 22, 2016

(30) Foreign Application Priority Data

Mar. 17, 2015 (JP) ................................. 2015-053039
Sep. 4, 2015 (JP) ................................. 2015-174439

(51) Int. Cl.
*B65H 20/02* (2006.01)
*B41J 13/076* (2006.01)
*B65H 27/00* (2006.01)
*F16D 1/02* (2006.01)
*B41J 11/00* (2006.01)

(52) U.S. Cl.
CPC .......... *B65H 20/02* (2013.01); *B41J 11/0025* (2013.01); *B41J 13/076* (2013.01); *B65H 27/00* (2013.01); *F16D 1/02* (2013.01); *B65H 2402/63* (2013.01); *B65H 2404/1374* (2013.01); *B65H 2404/1431* (2013.01); *B65H 2404/15* (2013.01); *B65H 2801/36* (2013.01)

(58) Field of Classification Search
CPC ........ B41J 11/025; B41J 13/03; B41J 13/076; B65H 20/02; B65H 20/04
USPC ....................................................... 492/40, 39
See application file for complete search history.

(56) References Cited

U.S. PATENT DOCUMENTS 2,415,578 A * 2/1947 Courtney ................. D01H 5/74
  492/39
3,345,722 A * 10/1967 Stahlecker ............... D01H 5/74
  384/418

(Continued)

FOREIGN PATENT DOCUMENTS

EP  1 072 424  1/2001
EP  1591391  11/2005

(Continued)

OTHER PUBLICATIONS

European Search Report for Application No. 16159596.2 dated Aug. 23, 2016.

*Primary Examiner* — Jason L Vaughan
(74) *Attorney, Agent, or Firm* — Workman Nydegger (57) ABSTRACT

A transportation apparatus transports a medium by using a transportation roller that includes plural rollers arranged in a rotation axis direction and a coupling portion for coupling an end portion of one of, among the plural rollers, two arranged adjacent to each other in the rotation axis direction to an end portion of the other. The coupling portion includes: a first bearing that supports the end portion of the first roller rotatably; a second bearing that supports the end portion of the second roller rotatably; a fixing member to which the first bearing and the second bearing are fixed; and a joint portion provided between the first bearing and the second bearing in the rotation axis direction for connecting the end portion of the first roller to the end portion of the second roller.

8 Claims, 9 Drawing Sheets

(56) References Cited

U.S. PATENT DOCUMENTS

| | | | | |
|---|---|---|---|---|
| 4,173,058 A | * | 11/1979 | Stieger | B29C 47/02 |
| | | | | 29/414 |
| 5,062,734 A | | 11/1991 | Vanzee et al. | |
| 7,798,949 B2 | * | 9/2010 | Vaaraniemi | F16C 13/04 |
| | | | | 492/39 |
| 7,972,253 B2 | * | 7/2011 | Pettersson | B22D 11/1287 |
| | | | | 492/1 |
| 9,168,583 B2 | * | 10/2015 | Axelsson | B22D 11/1287 |
| 9,682,825 B2 | * | 6/2017 | Rudolph | B65G 23/04 |
| 2005/0133190 A1 | * | 6/2005 | Axelsson | B22D 11/1287 |
| | | | | 164/448 |
| 2007/0082796 A1 | * | 4/2007 | Pettersson | B22D 11/1287 |
| | | | | 492/38 |

FOREIGN PATENT DOCUMENTS

| | | |
|---|---|---|
| JP | 2000-044084 | 2/2000 |
| JP | 2000-044084 A | 2/2000 |
| JP | 2007-039170 A | 2/2007 |

\* cited by examiner

TRANSPORTATION APPARATUS AND PRINTING APPARATUS

BACKGROUND

1. Technical Field

The present invention relates to a transportation apparatus for transporting a medium, and a printing apparatus equipped with the transportation apparatus.

2. Related Art

Some printers, as an example of a printing apparatus, are equipped with a transportation apparatus that transports a print medium by using a transportation roller. In such a transportation apparatus, as the width of a medium that is to be transported increases, it is necessary to increase the length of a transportation roller in the width direction. However, a longer transportation roller makes errors in manufacturing larger, resulting in a decrease in transportation precision.

To solve these problems, in related art, the transportation roller of a transportation apparatus is formed by coupling plural driving rollers in the width direction by using Oldham coupling, for example, as disclosed in JP-A-2000-044084.

In Oldham coupling, a protrusion is formed on one of two rotary shafts that are coupled to each other, and a groove is formed in the other. A feature of Oldham coupling is that the protrusion on the one shaft slides along the groove in the other to tolerate eccentricity. Since the coupling tolerates eccentricity in this way, advantageously, allowable margin of error in the manufacturing of each driving roller increases by an amount corresponding to the eccentricity tolerance. However, in Oldham coupling, backlash increases as a result of the wear and tear of its protrusion and groove, which occurs due to repeated use because of structural reasons, resulting in a decrease in transportation precision.

The problem described above is not limited to a transportation apparatus used in a printer. The same problem arises in a transportation apparatus that includes a transportation roller for transporting a medium, and in a printing apparatus.

SUMMARY

An advantage of some aspects of the invention is to provide a transportation apparatus that can reduce a decrease in transportation precision even in a case where there are manufacturing errors in plural rollers connected to one another, and to provide a printing apparatus.

Solving means according to some aspects, and operational effects thereof, are described below.

A transportation apparatus according to an aspect of the invention comprises: a transportation roller used for transporting a medium and includes plural rollers arranged in a rotation axis direction and a coupling portion for coupling an end portion of one of, among the plural rollers, two arranged adjacent to each other in the rotation axis direction to an end portion of the other, the adjacent two being defined as a first roller and a second roller, the coupling portion including, a first bearing that supports the end portion of the first roller rotatably; a second bearing that supports the end portion of the second roller rotatably; a fixing member to which the first bearing and the second bearing are fixed; and a joint portion provided between the first bearing and the second bearing in the rotation axis direction for connecting the end portion of the first roller to the end portion of the second roller.

The ends of the plural rollers making up the transportation roller are supported rotatably by the bearings. The change in position of the portion of the roller between two bearings is restricted by fixing the bearings to the fixing member. When the ends of the two rollers 71F and 71S are connected together by the joint portion 76 in this state, even if there is a manufacturing error in the joint, the position of the rotation axis of the portion between the bearings does not change and, therefore, it is possible to reduce a decrease in the transportation precision of the transportation roller as a whole. Accordingly, it is possible to reduce a decrease in transportation precision even in a case where there are manufacturing errors in the plural rollers connected to one another.

In the above transportation apparatus, the roller may have a shaft portion located at its end in the rotation axis direction; and the joint portion may be able to connect the shaft portion of the first roller and the shaft portion of the second roller together in a state in which deviation of the axial center of rotation of the shaft portion with respect to the axial center of the first bearing and the second bearing is tolerated.

With this structure, even in a case where the shaft portion of the roller that is to be connected contains a manufacturing error and where the axial center of rotation of the shaft portion is deviated eccentrically or angularly from the axial center of rotation of the portion supported by the bearing, the joint portion can connect the shaft portions of the two rollers together in a state in which the deviation is tolerated. Therefore, it is possible to connect two rollers containing a manufacturing error together at the coupling portion.

In the above transportation apparatus, the roller may have a shaft portion located at its end in the rotation axis direction; and the shaft portion may include a large diameter portion that is able to be in contact with the joint portion when connected by the joint portion, and a small diameter portion, outside diameter of which is smaller than that of the large diameter portion.

In the above structure, when the ends of the two rollers are connected together by the joint portion, the large diameter portions formed at the respective ends are in contact with the joint portion, whereas the small diameter portions, the outside diameter of which is smaller than that of the large diameter portions, are not in contact with the joint portion. That is, the size of the contact area where the joint portion is in contact with the shaft portion in the rotation axis direction is small. Therefore, the tilt of the shaft portion is tolerated within a range of a clearance produced between the small diameter portion and the joint portion. Therefore, even in a case of angular deviation of the shaft portion of the roller that is to be connected, the joint portion can connect the shaft portions of the two rollers together in a state in which such angular deviation is tolerated. For this reason, it is possible to connect the rollers containing a manufacturing error together at the coupling portion.

In the above transportation apparatus, the joint portion may include a cylindrical axial-hole-formed member that has an axial hole formed inside its inner cylindrical surface; the axial-hole-formed member may have a slit, first screw holes, and a second screw hole; the slit may be formed through a cylindrical portion in communication with the axial hole and extends in the rotation axis direction; the first screw holes making up a pair may be formed in the cylindrical portion in such a way as to face each other, with the axial hole located therebetween, and extend in a direction intersecting with the rotation axis direction; the second screw hole may be formed at a position closer to the slit than the first screw holes are; diameter of the axial hole may be able to be reduced by tightening a bolt screw-driven into the second screw hole; and two screws driven into the respective first screw holes may be able to be protruded into the axial hole.

In this structure, the axial-hole-formed member of the joint portion has the slit that is in communication with the axial hole defined by the inner circumferential surface thereof. Therefore, it is possible to reduce the width of the slit and reduce the diameter of the axial hole by tightening the bolt inserted in the second screw hole, which is formed at a position relatively close to the slit. Therefore, by reducing the diameter of the axial hole in a state in which the end portion of the first roller and the end portion of the second roller have been inserted into the axial hole from the respective two ends of the axial hole, it is possible to fasten the end portions of these two rollers. Moreover, by causing the screws to protrude into the axial hole through the first screw holes, which are formed as a pair, with the axial hole located therebetween, it is possible to fix the end portion of the roller inserted into the axial hole in such a way as to prevent its relative movement in relation to the axial-hole-formed member. By this means, it is possible to securely transmit rotation power between the first roller and the second roller via the joint portion.

A printing apparatus according to an aspect of the invention comprises: the transportation apparatus described above; and a printing unit that performs printing on the medium transported by the transportation apparatus described above. Since the decrease in transportation precision is reduced due to the function of the transportation apparatus, the printing unit can perform printing with high precision on the medium transported by the transportation roller.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

With reference to the accompanying drawings, a printing apparatus according to a first embodiment will now be explained. The printing apparatus is, for example, a large format printer that performs printing (recording) on a long medium.

Figure 1:
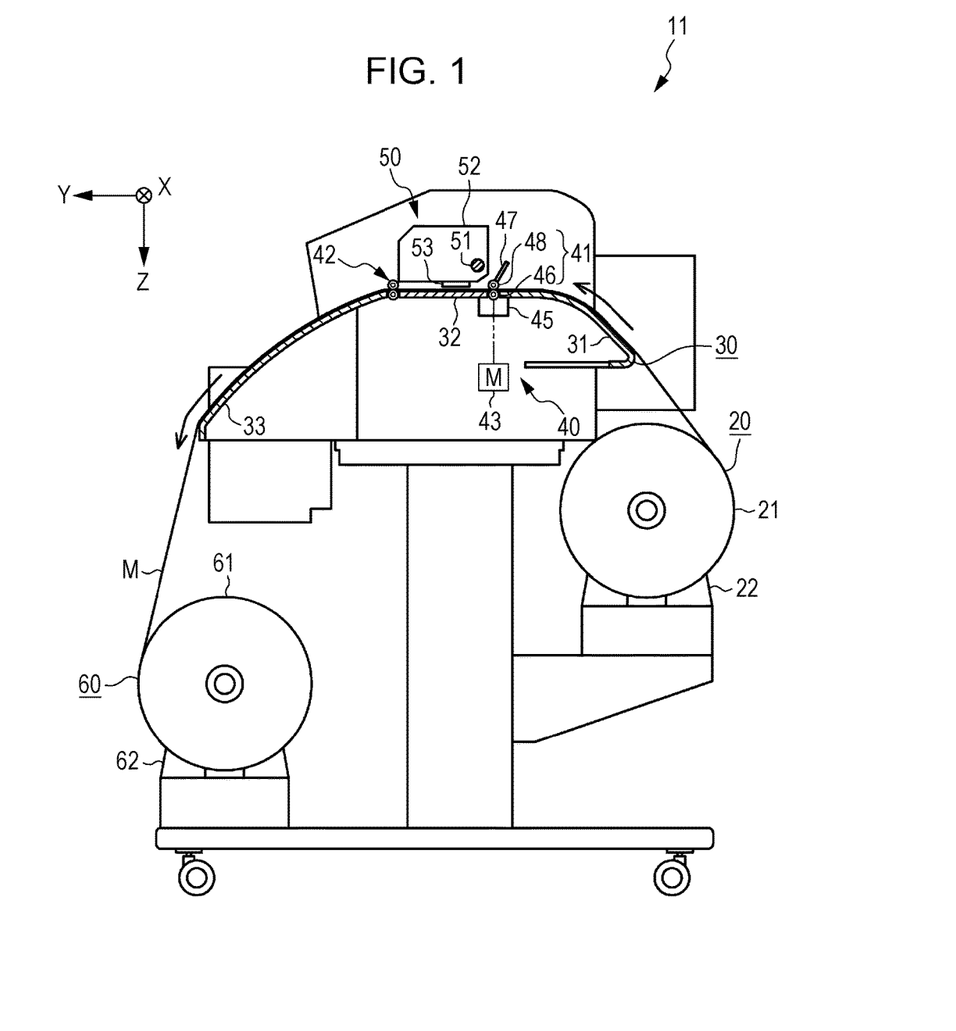
FIG. 1 is a sectional view that schematically illustrates a printing apparatus and a transportation apparatus according to a first embodiment.

As illustrated in FIG. 1, a printing apparatus 11 includes an unreeling unit 20, from which a medium M, which is initially in the form of a roll, is reeled out, a supporting unit 30, which supports the medium M, a transportation apparatus 40, which transports the medium M in the direction indicated by arrows in FIG. 1, a printing unit 50, which performs printing on the medium M, and a reeling unit 60, which takes up the medium M after the printing.

In the description below, one direction along the width (direction orthogonal to the sheet face of FIG. 1) of the medium M orthogonal to the length of the medium M is defined as a scan direction X, and the direction in which the medium M is transported at a position where printing is performed by the printing unit 50 is defined as a transportation direction Y. In the present embodiment, the scan direction X and the transportation direction Y intersect with (preferably, are orthogonal to) each other, and both of these two directions intersect with (preferably, are orthogonal to) the direction of gravity Z.

As illustrated in FIG. 1, the unreeling unit 20 includes a support portion 22, which supports a roll 21 of the medium M. The support portion 22 can support plural types of the roll 21 that differ from one another in terms of size in the scan direction X and the number of wraps. The unreeling unit 20 reels out the medium M from the roll 21 by rotating the roll 21 in one direction (in the counterclockwise direction in FIG. 1).

The supporting unit 30 includes a first supporting portion 31, a second supporting portion 32, and a third supporting portion 33. These three supporting portions make up a transportation path along which the medium M is transported. The first supporting portion 31 guides the medium M reeled out by the unreeling unit 20 toward the second supporting portion 32. The second supporting portion 32 is provided at a position where it faces the printing unit 50. The second supporting portion 32 supports the medium M during printing. The third supporting portion 33 guides the medium M toward the reeling unit 60 after the printing by the printing unit 50.

The printing unit 50 includes a guide shaft 51, which extends in the scan direction X, a carriage 52, which is supported on the guide shaft 51, and a print head 53, which ejects ink toward the medium M. Driven by a carriage motor that is not illustrated in the drawing, the carriage 52 reciprocates in the scan direction X along the guide shaft 51. The print head 53 is mounted on the bottom portion of the carriage 52 so as to face the medium M supported by the second supporting portion 32. The printing unit 50 performs print operation of forming characters and/or an image on the medium M by ejecting ink from the print head 53 during the movement of the carriage 52 in the scan direction X.

The reeling unit 60 includes a support portion 62, which supports a roll 61 of the taken up medium M. The reeling unit 60 takes up the medium M after the printing by rotating the roll 61 in one direction (in the counterclockwise direction in FIG. 1).

Next, the structure of the transportation apparatus 40 will now be explained in detail. The transportation apparatus 40 includes a pair of transportation rollers 41, which is provided between the first supporting portion 31 and the second supporting portion 32 in the transportation direction Y, a pair of ejection rollers 42, which is provided between the second supporting portion 32 and the third supporting portion 33, and a transportation motor 43. In the present embodiment, the direction of the axis of rotation of the pair of transportation rollers 41 and the pair of ejection rollers 42 is the scan direction X.

The transportation roller pair 41 is made up of a transportation roller 46, which is provided on a support table 45, and a driven roller array 48, which is supported by a support mechanism 47. The transportation roller 46 and the driven roller array 48 are configured to nip the medium M therebetween. The support mechanism 47 includes an urging means (not illustrated) for pressing the driven roller array 48 against the transportation roller 46. Receiving drive power from the transportation motor 43, the transportation roller 46 rotates in the counterclockwise direction in FIG. 1. By this means, the pair of transportation rollers 41 transports the nipped medium M toward the second supporting portion 32.

Figure 2:
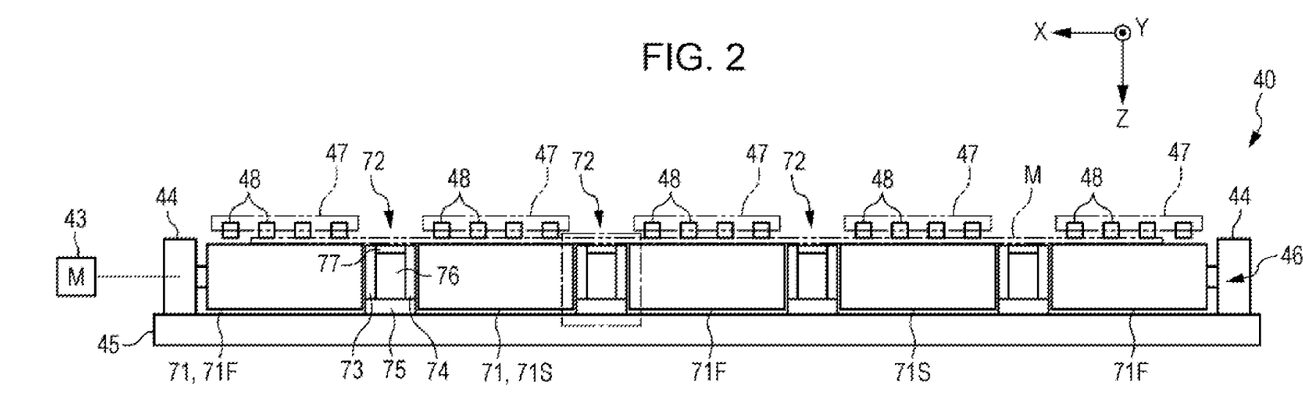
FIG. 2 is a front view that illustrates the structure of the transportation apparatus of the first embodiment.

As illustrated in FIG. 2, the transportation apparatus 40 includes plural rollers 71 (71F and 71S) arranged in the rotation axis direction, and further includes at least one coupler 72 for coupling an end portion of one of, among the plural rollers 71, two that are arranged adjacent to each other in the rotation axis direction to an end portion of the other. The plural rollers 71 coupled via the couplers 72 constitute the transportation roller 46.

The supports 47 are provided at respective positions corresponding to the rollers 71 in the rotation axis direction. Each one support 47 supports plural driven rollers 48 rotatably. The driven rollers 48 are arranged in a line but not at the areas of the couplers 72. The driven rollers 48 press the medium M against the rollers 71.

In the transportation roller 46, let us define one of two rollers 71 arranged adjacent to each other in the rotation axis direction as a first roller 71F, and the other as a second roller 71S. In the present embodiment, the transportation roller 46 is made up of three first rollers 71F, two second rollers 71S, and four couplers 72, wherein the five rollers 71F and 71S are arranged alternately in the rotation axis direction, and wherein each of the couplers 72 is arranged between two rollers 71F and 71S. The number of the rollers 71 and the number of the couplers 72 making up the transportation roller 46 can be modified arbitrarily. Among the plural rollers 71 making up the transportation roller 46, each of two end rollers located at the respective two ends in the rotation axis direction has a non-coupling end portion, at which no coupler 72 is provided. These two non-coupling end portions are supported rotatably by respective two sidewalls 44, which are formed integrally with the support table 45.

The coupler 72 includes a first bearing 73, which supports an end portion of a first roller 71F rotatably, a second bearing 74, which supports an end portion of a second roller 71S rotatably, a fixing member 75, to which the first bearing 73 and the second bearing 74 are fixed, a joint portion 76, and a cover member 77, by which the joint portion 76 is covered. The first bearing 73 and the second bearing 74 are fixed to the fixing member 75 in a state in which their movement in the rotation axis direction and in a direction intersecting with the rotation axis direction is restricted. The joint portion 76 is located between the first bearing 73 and the second bearing 74 in the rotation axis direction. The joint portion 76 connects the end portion of the first bearing 73 and the end portion of the second bearing 74 together in such a way as to be able to transmit a force of rotation. The function of the cover member 77 is to prevent the medium M from sagging at the coupler 72 by not exposing the joint portion 76, the outside diameter of which is smaller than that of the rollers 71.

Figure 3:
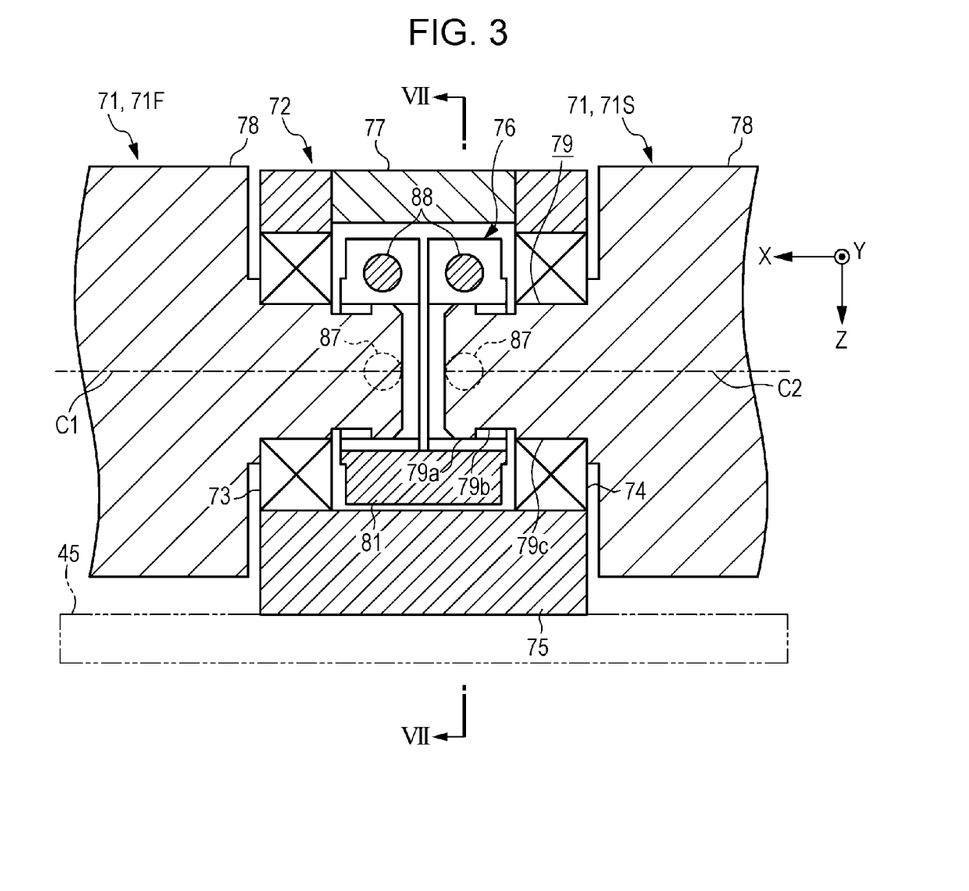
FIG. 3 is an enlarged sectional view of the part indicated by a dot-and-dash-line box in FIG. 2.

As illustrated in FIG. 3, the roller 71 has a columnar contact portion 78, which is configured to be in contact with the medium M when the medium M is transported, and a pair of shaft portions 79, which are located at the respective two ends in the rotation axis direction. The outside diameter of the shaft portions 79 is smaller than that of the contact portion 78. The first bearing 73 and the second bearing 74 are mounted respectively on the first roller 71F and the second roller 71S coaxially with the axial center C1 of rotation of the contact portion 78 of the first roller 71F and the axial center C2 of rotation of the contact portion 78 of the second roller 71S. In a state in which the first bearing 73 and the second bearing 74 are fixed to the fixing member 75, theoretically, in each of the first roller 71F and the second roller 71S, the change in position of the portion between two bearings (contact portion 78) is restricted.

However, actually, because of the existence of an inner gap in the bearing 73, 74, there is a room for a relative slight change in position of the roller 71, which is in engagement with the inner circumferential portion of the bearing 73, 74, in the axial direction and radial direction of the bearing 73, 74 in relation to the fixing member 75, which is in engagement with the outer circumferential portion of the bearing 73, 74. In other words, in a case where a force or moment acts on the shaft portion 79 of the roller 71, it has an influence on the contact portion 78 of the roller 71 because the roller 71 is not fixed by the bearing 73, 74.

The shaft portion 79 includes a large diameter portion 79a, which is able to be in contact with the joint portion 76 when connected by the joint portion 76, a small diameter portion 79b, the outside diameter of which is smaller than that of the large diameter portion 79a, and an engagement portion 79c configured to be in engagement with the first bearing 73 or the second bearing 74. In the roller 71 of the present embodiment, the large diameter portion 79a is formed at the end of the shaft portion 79, and the small diameter portion 79b is formed between the large diameter portion 79a and the engagement portion 79c in the rotation axis direction.

Figure 4:
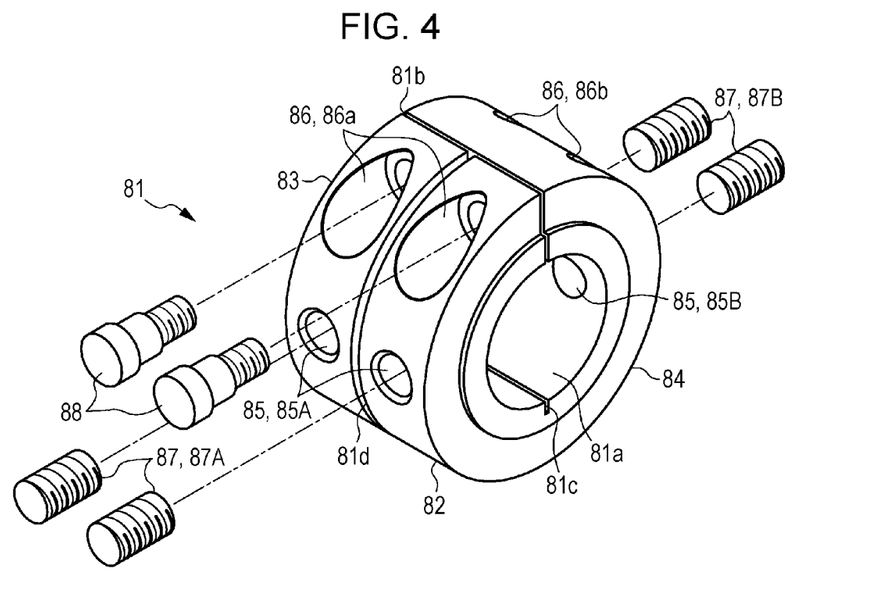
FIG. 4 is a perspective view of a joint portion according to the first embodiment, taken from a first direction.
Figure 5:
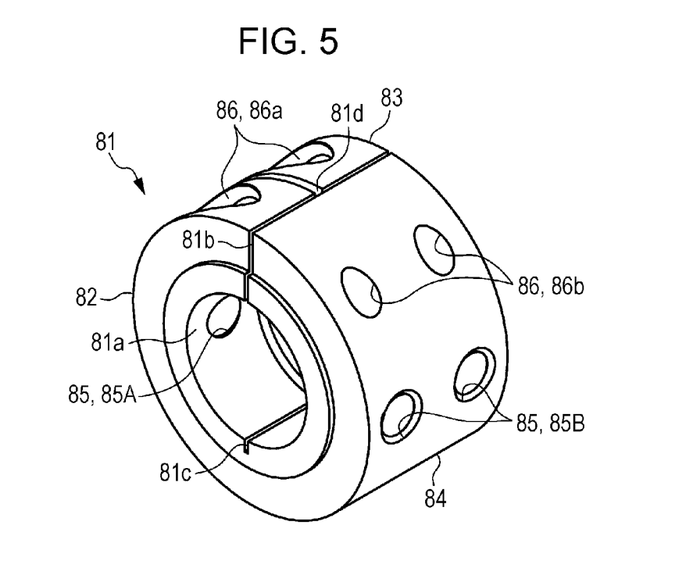
FIG. 5 is a perspective view of the joint portion of the first embodiment, taken from a second direction.
Figure 6:
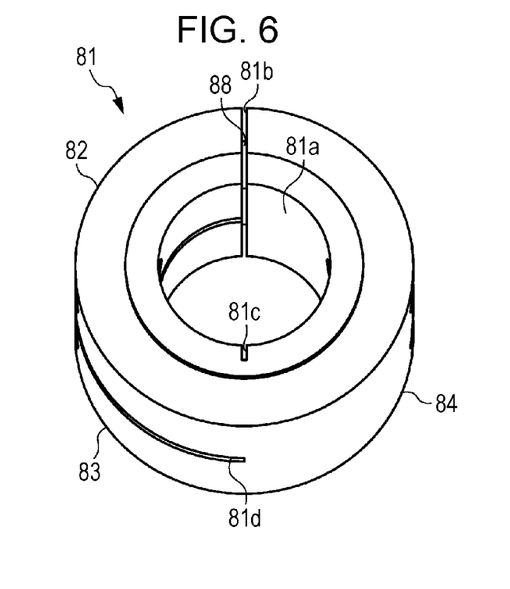
FIG. 6 is a perspective view of the joint portion of the first embodiment, taken from a third direction.

As illustrated in FIGS. 4, 5, and 6, the joint portion 76 includes an axial-hole-formed member 81, which has a cylindrical shape. An axial hole 81a is formed inside the inner cylindrical surface of the axial-hole-formed member 81. The axial-hole-formed member 81 has a first slit 81b, a groove portion 81c, and a second slit 81d. The first slit 81b is formed through the cylindrical portion in communication with the axial hole 81a and extends in the rotation axis direction. The groove portion 81c is formed in the inner circumferential surface of the cylindrical portion at the opposite position in relation to the first slit 81b. The second slit 81d extends in the circumferential direction from the first slit 81b to the groove portion 81c.

In the cylindrical portion of the axial-hole-formed member 81, let us define two sections demarcated by the first slit 81b, the second slit 81d, and the groove portion 81c as a first fixing section 82 and a second fixing section 83, and the remaining hemi-cylindrical section (section from the first slit 81b to the groove portion 81c) as a body section 84. When defined in this way, the first fixing section 82 and the second fixing section 83 are arranged adjacent to each other in the rotation axis direction. The first fixing section 82 is formed at a position corresponding to the shaft portion 79 of the first roller 71F. The second fixing section 83 is formed at a position corresponding to the shaft portion 79 of the second roller 71S.

As illustrated in FIGS. 4 to 7, the axial-hole-formed member 81 has two pairs of first screw holes 85 and two pairs of second screw holes 86. In each of the two pairs of first screw holes 85, these two holes are formed in the cylindrical portion in such a way as to face each other, with the axial hole 81*a* located therebetween, and extend in a direction intersecting with (orthogonal to) the rotation axis direction. The axial direction of the second screw holes 86 is parallel to that of the first screw holes 85. The second screw holes 86 are formed at respective positions closer to the first slit 81*b* than the first screw holes 85 are. Preferably, the first screw holes 85 (85A, 85B) and the second screw holes 86 (86*a*, 86*b*) should be formed at positions corresponding to the large diameter portion 79*a* in the shaft portion 79 of the roller 71 in the rotation axis direction.

Bolts 88, each of which has a head, are driven into the second screw holes 86. One of two 86*a* and 86*b* making up each pair of second screw holes 86, specifically, the screw hole 86*a* (the right one in FIG. 7), has a shape that can accommodate the head of the bolt 88. When the bolt 88 is fastened by being driven across the first slit 81*b* from one screw hole 86*a* toward the other screw hole 86*b*, the bolt 88 causes the flexural change in position of the fixing section 82, 83 centering upon the groove portion 81*c* in such a way as to make the clearance of the first slit 81*b* narrower.

Figure 7:
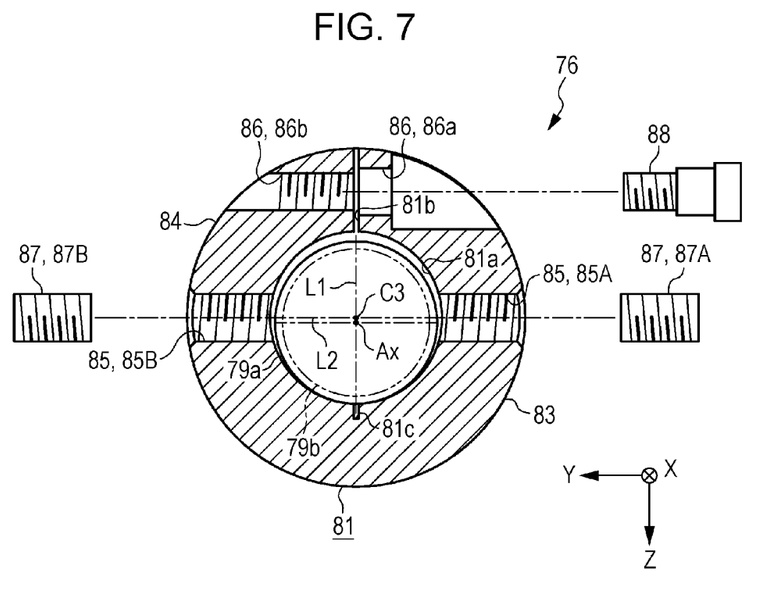
FIG. 7 is a sectional view that illustrates the structure of the joint portion of the first embodiment, taken along the line VII-VII of FIG. 3.

That is, since the axial-hole-formed member 81 has the first slit 81*b* and the groove portion 81*c* in its cylindrical portion, it has a structure that enables the diameter of the axial hole 81*a* to be reduced by tightening the bolt 88 screw-driven into the second screw hole 86. The end portion (shaft portion 79) of the first roller 71F and the end portion (shaft portion 79) of the second roller 71S are inserted into the axial hole 81*a* from the respective two ends of the axial hole 81*a* in the rotation axis direction. In this roller-end-inserted state, the diameter of the axial hole 81*a* of the axial-hole-formed member 81 is reduced, thereby fastening the shaft portions 79 of the rollers 71.

The screw holes 86*a*, that is, one in the paired second screw holes 86, are formed respectively in the first fixing section 82 and the second fixing section 83, and are arranged adjacent to each other in the rotation axis direction. The screw holes 86*b*, that is, the other in the paired second screw holes 86, are formed in the body section 84, and are arranged adjacent to each other in the rotation axis direction. The two bolts 88, which are arranged adjacent to each other in the rotation axis direction, fix the shaft portion 79 of the first roller 71F and the shaft portion 79 of the second roller 71S respectively to the axial-hole-formed member 81.

Two headless screws 87 are driven into the first screw hole 85A and the first screw hole 85B respectively. The screw 87 driven into the screw hole 85A is denoted as 87A, and the screw 87 driven into the screw hole 85B is denoted as 87B.

When the two screws 87 are fastened by being driven into the respective first screw holes 85A and 85B, the respective two ends of these screws protrude into the axial hole 81*a* to come into contact with the large diameter portion 79*a* of the roller 71, thereby pinching the shaft portion 79 of the roller 71 therebetween. This restricts the relative movement of the shaft portion 79 of the roller 71 in the circumferential direction in relation to the axial-hole-formed member 81 more strongly, with the shaft portion 79 fastened as the result of the reduction in the diameter of the axial hole 81*a*.

The screw holes 85A, that is, one in the paired second screw holes 85, are formed respectively in the first fixing section 82 and the second fixing section 83 near the center in the circumferential direction, and are arranged adjacent to each other in the rotation axis direction. The screw holes 85B, that is, the other in the paired second screw holes 85, are formed in the body section 84 near the center in the circumferential direction, and are arranged adjacent to each other in the rotation axis direction. At each side, the two screws 87 that are arranged adjacent to each other in the rotation axis direction fix the shaft portion 79 of the first roller 71F and the shaft portion 79 of the second roller 71S respectively to the axial-hole-formed member 81.

As illustrated in FIG. 7, in cross section of the axial-hole-formed member 81 taken along a plane orthogonal to the rotation axis direction, preferably, the first slit 81*b* of the axial-hole-formed member 81 and the groove portion 81*c* thereof should be located opposite each other, and, preferably, the center axis C3 of the cylindrical portion of the axial-hole-formed member 81 and a virtual line L1 connecting the first slit 81*b* and the groove portion 81*c* should cross each other. In addition, preferably, the common axial line L2 of the first screw holes 85 (85A, 85B) making up each pair should be orthogonal to the virtual line L1 passing through the center axis C3. In FIG. 7, the illustrated size of the shaft portion 79 is slightly smaller than to-scale size to make a positional relationship among the constituent members clearer.

Next, the method of connecting the first roller 71F and the second roller 71S will now be explained. First, the shaft portion 79 of the first roller 71F and the shaft portion 79 of the second roller 71S are inserted into respective positions corresponding to the first fixing section 82 and the second fixing section 83 of the axial-hole-formed member 81, and, in this roller-end-inserted state, the bolts 88 are driven gently into the second screw holes 86 of the axial-hole-formed member 81 for fastening with a weak force each. As a result, the first slit 81*b* becomes narrower, and the axial hole 81*a* becomes smaller. Therefore, the shaft portion 79 of the first roller 71F and the shaft portion 79 of the second roller 71S are pushed toward the groove portion 81*c*.

Next, the position of the fixing member 75, which supports the bearings 73 and 74, is finely adjusted so as to bring the axial center C1 of rotation of the contact portion 78 of the first roller 71F and the axial center C2 of rotation of the contact portion 78 of the second roller 71S into alignment with each other, and to bring the axial center C1, C2 into alignment with the axial center of the bearing 73, 74.

Next, the screws 87 are driven gently into the first screw holes 85 for fastening with a weak force each. Preferably, this fastening at the one screw hole 85A and the other screw hole 85B should be performed alternately in a balanced manner so as to attain equal pinching of the shaft portion 79. For example, first, the screw 87A is inserted into the screw hole 85A, which is formed in the first, second fixing section 82, 83, and is rotated by a predetermined amount; after that, the screw 87B is inserted into the screw hole 85B, which is formed in the body section 84, and is rotated by the same amount. As a result, the end of the screw 87 protruding into the axial hole 81*a* through the screw hole 85A and the end of the screw 87 protruding into the axial hole 81*a* through the screw hole 85B come into contact with the shaft portion 79 to restrict the relative rotation of the shaft portion 79 in relation to the axial-hole-formed member 81.

In this way, the rollers 71F and 71S are positioned in relation to the axial-hole-formed member 81 sequentially by means of the bolts 88, the screws 87A, and the screws 87B, and, after the positioning, the bolts 88 and the screws 87 are tightened in the sequential order of the positioning (for example, in the order of the bolts 88, the screws 87A, and the screws 87B) so as to fix the rollers 71F and 71S to the axial-hole-formed member 81, resulting in a state in which the end portion of the first roller 71F and the end portion of the second roller 71S are connected together by the joint portion 76.

Next, the operation of the printing apparatus 11 equipped with the transportation apparatus 40 described above will now be explained. The transportation apparatus 40 includes the plural rollers 71, which are arranged in the rotation axis direction, and further includes the coupler 72 for coupling an end portion of one of, among the plural rollers 71, two that are arranged adjacent to each other in the rotation axis direction to an end portion of the other. The transportation apparatus 40 transports the medium M by using its transportation roller 46, which includes the plural rollers 71 coupled via the couplers 72. Even if the medium M that is to be transported has a large width (is long in the scan direction X, which is the rotation axis direction), the width size (length) of the transportation roller 46 can be increased by connecting the plural rollers 71 in a line, without increasing the size of a single member. Therefore, it is possible to prevent an error in manufacturing from becoming larger due to the increase in size.

However, when plural rollers 71 are connected, each individual one of the rollers 71 contains an individual manufacturing error. Therefore, when these rollers are connected in the rotation axis direction, the individual manufacturing errors of them are added to one another. There is a risk that the cumulative error might cause a decrease in the transportation precision of the medium M due to, for example, the distortion of the axial center of rotation of the transportation roller 46, resulting in a decrease in print precision.

In this respect, in the transportation roller 46 of the present embodiment, the engagement portion 79c, which is, in the shaft portion 79, the part closest to the contact portion 78, is immovably anchored by means of the bearing 73, 74 and the fixing member 75 in a state in which the axial center C1, C2 of rotation of the contact portion 78 of each of the rollers 71 is in alignment. This makes it harder for the individual manufacturing errors of the rollers 71 to cumulate as the error of the transportation roller 46 as a whole.

In each individual roller 71, there is a possibility of eccentric or angular deviation between the axial center of rotation of the contact portion 78 and that of the shaft portion 79 due to an error in manufacturing. Even with such deviation of the shaft portion 79, the joint portion 76 can connect two rollers 71 together.

Figure 8:
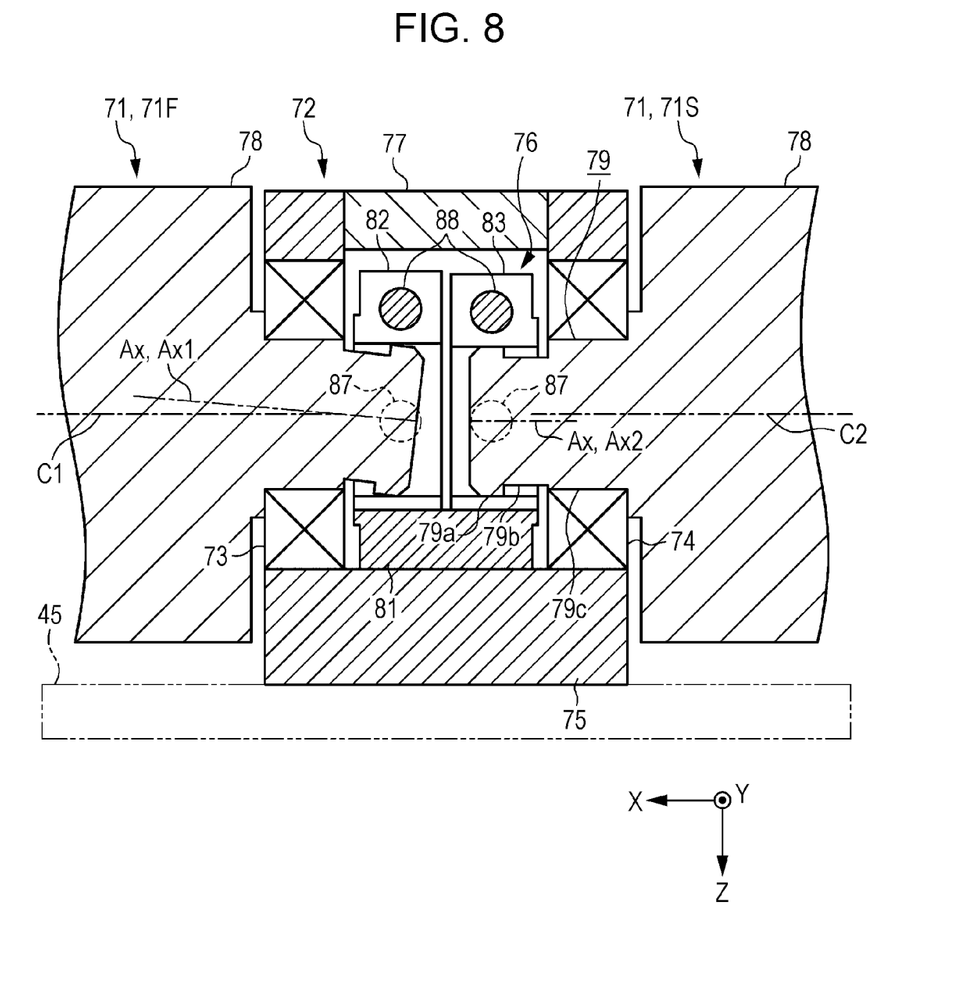
FIG. 8 is a sectional view for explaining the operation of a coupling portion according to the first embodiment.

For example, even with angular deviation of the axial center Ax (Ax1) of rotation of the shaft portion 79 from the axial center C1 of rotation of the contact portion 78 in the first roller 71F as illustrated in FIG. 8, in the process of fastening to the axial-hole-formed member 81 by means of the bolt 88, the first fixing section 82 changes its position with flexure along the shaft portion 79 that is in a state of angular deviation, thereby fixing the large diameter portion 79a of the shaft portion 79. In a similar way, even with eccentric deviation of the axial center Ax (Ax2) of rotation of the shaft portion 79 from the axial center C2 of rotation of the contact portion 78 in the second roller 71S, in the process of fastening to the axial-hole-formed member 81 by means of the bolt 88, the second fixing section 83 changes its position with flexure along the shaft portion 79 that is in a state of eccentric deviation, thereby fixing the large diameter portion 79a of the shaft portion 79.

That is, since the axial-hole-formed member 81 has the first slit 81b and the groove portion 81c each extending in the rotation axis direction in its cylindrical portion, it is possible to fix the shaft portion 79 while tolerating the positional deviation of the shaft portion 79 by adjusting the diameter of the axial hole 81a by means of the fastening force of the bolt 88. Since the axial-hole-formed member 81 has the second slit 81d extending in the circumferential direction in its cylindrical portion, each of the first fixing section 82 and the second fixing section 83 split by the second slit 81d is configured to be able to change its position with flexure separately from the other. Because of the separate flexural change in position, deviation of the shaft portion 79 of the first roller 71F and the shaft portion 79 of the second roller 71S arranged in the rotation axis direction is tolerated individually.

When the end portions of the rollers 71F and 71S are connected together in this way, the axial center Ax of rotation of each shaft portion 79 is deviated from the axial center C1, C2 of rotation of the contact portion 78; however, since the bearings 73 and 74 are fixed to the fixing member 75 after the alignment of the axial center C1, C2 of rotation of the contact portion 78 with the axial center of the bearing 73, 74, it is less likely that the deviation of the shaft portions 79 will affect the transportation of the medium M.

As described above, the joint portion 76 can connect the shaft portion 79 of the first roller 71F and the shaft portion 79 of the second roller 71S together in a state in which the deviation of the axial center Ax of rotation of the shaft portion 79 with respect to the axial center of the bearing 73, 74 is tolerated. Therefore, it is possible to fix the bearings 73 and 74 to the fixing member 75 in a state in which the axial center C1 of rotation of the contact portion 78 of the first roller 71F and the axial center C2 of rotation of the contact portion 78 of the second roller 71S are in alignment, and, after that, connect the two shaft portions 79 containing a manufacturing error together by means of the joint portion 76. With this coupling, it is less likely that the transportation precision of the transportation roller 46 as a whole will decrease even if the number of the constituent rollers 71 of the transportation roller 46 increases, and it is possible to ensure high transportation precision of the transportation roller 46 as a whole without requiring very high manufacturing precision of the rollers 71 connected in a line.

In the present embodiment, the small diameter portion 79b is formed in the shaft portion 79 so as to decrease the size of an area where the shaft portion 79 is in contact with the axial-hole-formed member 81, thereby making it easier to tolerate the manufacturing error of the shaft portion 79. However, when rotation power is transmitted from one roller 71 to the other roller 71, there is a risk that the smaller area of contact of the shaft portion 79 with the axial-hole-formed member 81 might cause the slipping of the shaft portion 79 of the other roller 71 on the axial-hole-formed member 81 in the circumferential direction.

In this respect, since the large diameter portion 79a of the shaft portion 79 in contact with the joint portion 76 is fastened by means of two screws 87, it is possible to suppress the relative movement of the roller 71 in the circumferential direction in relation to the axial-hole-formed member 81 and to securely transmit rotation power from one roller 71 to the other roller 71. In the joint portion 76, the two screws 87 may be in contact with the small diameter portion 79*b*; even with this modification, it is possible to suppress the relative movement of the roller 71 in relation to the axial-hole-formed member 81.

As illustrated in FIG. 7, each second screw hole 86, into which the bolt 88 is driven, is formed at a position relatively close to the first slit 81*b*. Therefore, when the bolt 88 is fastened to reduce the diameter of the axial hole 81*a*, the shaft portion 79 inserted in the axial hole 81*a* shifts toward the groove portion 81*c*. That is, the axial center Ax of rotation of the shaft portion 79 shifts to a position that is more distant from the first slit 81*b* than the center axis C3 of the axial-hole-formed member 81 is.

Therefore, when the first screw holes 85 are arranged in such a way that the axial line L2 of the first screw holes 85 is orthogonal to the virtual line L1 passing through the center axis C3, the ends of the screws 87 driven into the first screw holes 85 are in contact with the circumferential surface at positions shifted toward the first slit 81*b* from the axial center Ax of rotation of the shaft portion 79. As a result, the screws 87 fix the shaft portion 79 in such a way as to further push the shaft portion 79 onto the groove portion 81*c*.

Therefore, if the positions of the first slits 81*b* in the circumferential direction are in alignment with one another in the plural couplers 72 arranged in the rotation axis direction, it is possible to shift and fix the plural shaft portions 79 in the same direction. With the alignment of the axial center Ax (Ax1, Ax2) of rotation of the shaft portions 79 arranged adjacent to one another in a line, it is possible to align the axial center C1, C2 of rotation of the contact portions 78.

Figure 9:
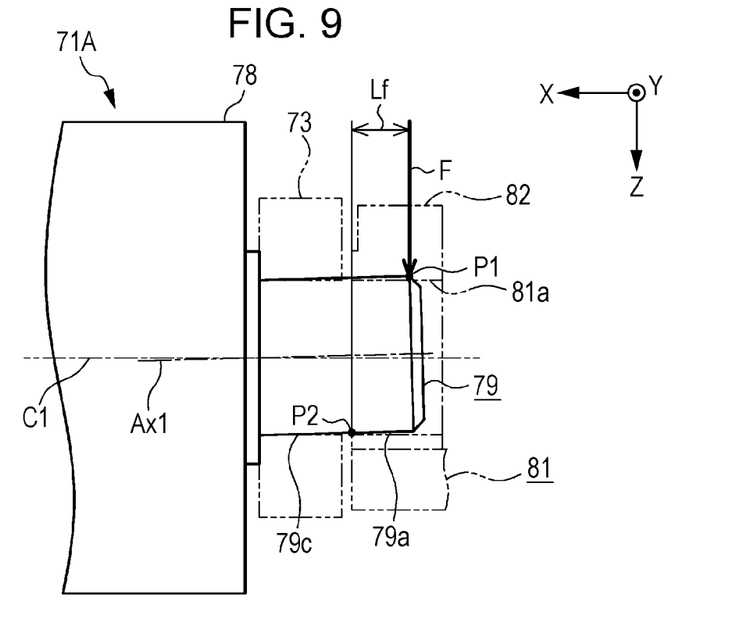
FIG. 9 is a schematic view for explaining a force that acts on a roller of a comparative example.
Figure 10:
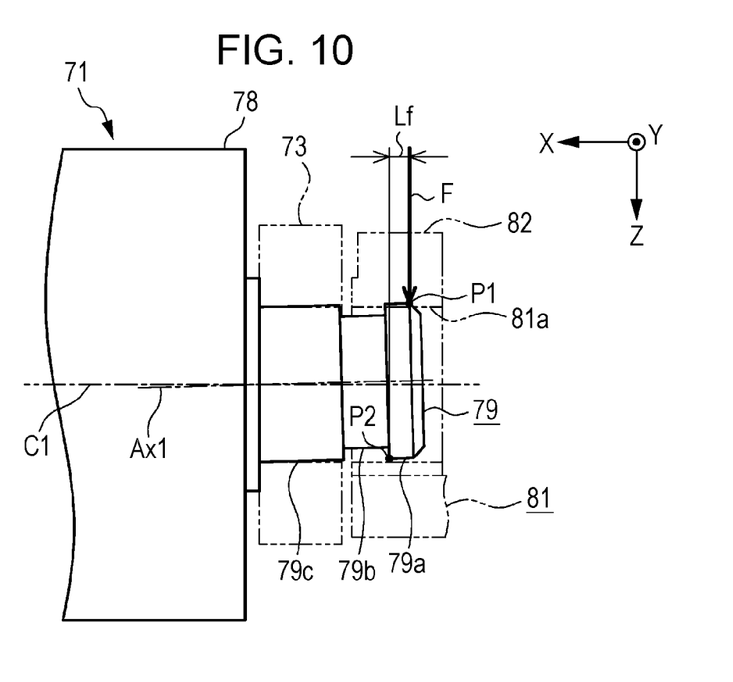
FIG. 10 is a schematic view for explaining a force that acts on a roller according to the first embodiment.

Next, moment that is produced at the shaft portion 79 of the roller 71, 71A will now be explained while comparing the roller 71A of a comparative example illustrated in FIG. 9 with the roller 71 of the present embodiment illustrated in FIG. 10. In FIGS. 9 and 10, for easier understanding, the tilt of the shaft portion 79 of the roller 71, 71A is illustrated in an exaggerated manner. That is, actually, in the axial direction of the roller 71, 71A, the axial center of rotation of the engagement portion 79*c* near the contact portion 78 is substantially in alignment with the axial center C1 of rotation of the contact portion 78.

As illustrated in FIG. 9, the shaft portion 79 of the roller 71A of the comparative example has the large diameter portion 79*a* and the engagement portion 79*c* only. Therefore, the contact area size of the axial-hole-formed member 81 and the shaft portion 79 of the roller 71A of the comparative example illustrated in FIG. 9 is larger than the contact area size of the axial-hole-formed member 81 and the shaft portion 79 of the roller 71 of the present embodiment illustrated in FIG. 10.

As illustrated in FIGS. 9 and 10, in a case of angular deviation (tilt) of the axial center Ax1 of rotation of the shaft portion 79 of the roller 71, 71A from the axial center C1 of rotation of the contact portion 78, when the shaft portion 79 of the roller 71, 71A is fastened, the shaft portion 79 deforms in such a way that the axial center Ax1 of rotation of the shaft portion 79 of the roller 71, 71A comes closer to the axial center C1 of rotation of the contact portion 78.

As a result of reduction in the diameter of the axial hole 81*a* in a state in which the shaft portion 79 is inserted in the axial hole 81*a* of the axial-hole-formed member 81, load acts toward the axial center Ax (Ax1) of rotation at an end position P1 of the shaft portion 79 and at a position P2, which is closer to the base than the position P1 is. Specifically, with the position P2 of the shaft portion 79 taken as a reference, moment of a product acts on the shaft portion 79, wherein the product is expressed by the multiplication of the distance from the position P2 to the position P1 in the axial direction (arm length) and the load F acting at the position P1. In this case, the position P1 is the power point, and the position P2 is the point of application.

This moment acts on the shaft portion 79 of the roller 71, 71A due to the end-to-end connection of the shaft portion 79 of the roller 71, 71A. However, because of the existence of an inner gap in the bearing 73, which is in engagement with the shaft portion 79 (engagement portion 79*c*) of the roller 71, 71A, there is a risk that the contact portion 78 of the roller 71, 71A might get warped as the moment increases.

As illustrated in FIGS. 9 and 10, the distance Lf in the present embodiment, in which the small diameter portion 79*b* is formed in the shaft portion 79, is shorter than the distance Lf in the comparative example, in which the small diameter portion 79*b* is not formed in the shaft portion 79. Since the small diameter portion 79*b* is formed in the present embodiment, the moment produced at the shaft portion 79 of the roller 71 when the shaft portion 79 of the roller 71 is connected is smaller than that of the comparative example. Therefore, the present embodiment reduces a risk that the connection of the shaft portion 79 of the roller 71 might cause the warping of the roller 71.

The first embodiment described above produces the following advantageous effects:

(1) The ends of the plural rollers 71 making up the transportation roller 46 are supported rotatably by the bearings 73 and 74. The change in position of the portion of the roller 71 between two bearings (contact portion 78) is restricted by fixing the bearings 73 and 74 to the fixing member 75. When the ends of the two rollers 71F and 71S are connected together by the joint portion 76 in this state, even if there is a manufacturing error in the joint, that is, the shaft portions 79 of the rollers 71, the position of the rotation axis of the portion between the bearings 73 and 74 does not change and, therefore, it is possible to reduce a decrease in the transportation precision of the transportation roller 46 as a whole. Accordingly, it is possible to reduce a decrease in transportation precision even in a case where there are manufacturing errors in the plural rollers 71 connected to one another. Since the decrease in transportation precision is reduced due to the function of the transportation apparatus 40, the printing unit 50 can perform printing with high precision on the medium M transported by the transportation roller 46.

(2) Even in a case where the shaft portion 79 of the roller 71 that is to be connected contains a manufacturing error and where the axial center Ax of rotation of the shaft portion 79 is deviated eccentrically or angularly from the axial center C1, C2 of rotation of the contact portion 78 supported by the bearing 73, 74, the joint portion 76 can connect the shaft portions 79 of the two rollers 71 together in a state in which the deviation is tolerated. Therefore, it is possible to connect the two rollers 71 containing a manufacturing error together at the coupler 72.

(3) When the ends of the two rollers 71F and 71S are connected together by the joint portion 76, the large diameter portions 79*a* formed at the respective ends (the shaft portions 79) are in contact with the joint portion 76, whereas the small diameter portions 79*b*, the outside diameter of which is smaller than that of the large diameter portions 79*a*, are not in contact with the joint portion 76. That is, the size of the contact area where the joint portion 76 is in contact with the shaft portion 79 in the rotation axis direction is small. Therefore, the tilt of the shaft portion 79 is tolerated within a range of a clearance produced between the small diameter portion 79*b* and the joint portion 76. Therefore, even in a case where the shaft portion 79 of the roller 71 that is to be connected is deviated angularly in relation to the contact portion 78, the joint portion 76 can connect the shaft portions 79 of the two rollers 71 together in a state in which such angular deviation is tolerated. For this reason, it is possible to connect the rollers 71 containing a manufacturing error together at the coupler 72.

(4) The axial-hole-formed member 81 of the joint portion 76 has the first slit 81b, which is in communication with the axial hole 81a defined by the inner circumferential surface thereof. Therefore, it is possible to reduce the width of the first slit 81b and reduce the diameter of the axial hole 81a by tightening the bolt 88 inserted in the second screw hole 86, which is formed at a position relatively close to the first slit 81b. Therefore, by reducing the diameter of the axial hole 81a in a state in which the end portion of the first roller 71F and the end portion of the second roller 71S have been inserted into the axial hole 81a from the respective two ends of the axial hole 81a, it is possible to fasten the end portions of these two rollers. Moreover, by causing the screws 87 to protrude into the axial hole 81a through the first screw holes 85, which are formed as a pair, with the axial hole 81a located therebetween, it is possible to fix the end portion of the roller 71 inserted into the axial hole 81a in such a way as to prevent its relative movement in relation to the axial-hole-formed member 81. By this means, it is possible to securely transmit rotation power between the first roller 71F and the second roller 71S via the joint portion 76.

(5) The size of the contact area (contact length) of the shaft portion 79 with the axial-hole-formed member 81 in the axial direction of the roller 71 is reduced by forming the small diameter portion 79b in the shaft portion 79. Because of the smaller contact area size, moment that acts on the shaft portion 79 of the roller 71 when the shaft portion 79 of the roller 71 is connected becomes smaller; accordingly, it is possible to reduce a risk of the warping of the roller 71. Consequently, in the transportation apparatus 40, it is possible to reduce a decrease in the transportation precision of the medium M.

Second Embodiment

Next, with reference to the accompanying drawings, a printing apparatus (transportation apparatus) according to a second embodiment will now be explained. In the second embodiment, the fixing structure of the fixing member 75 and the support table 45, an explanation of which is omitted in the first embodiment, is described. Therefore, in the following description of the second embodiment, the same reference numerals are assigned to the same members and components that are the same as those of the first embodiment, and an explanation of them is omitted. The members and components with the same reference numerals in the second embodiment include those whose shape is modified slightly for easier understanding.

Figure 11:
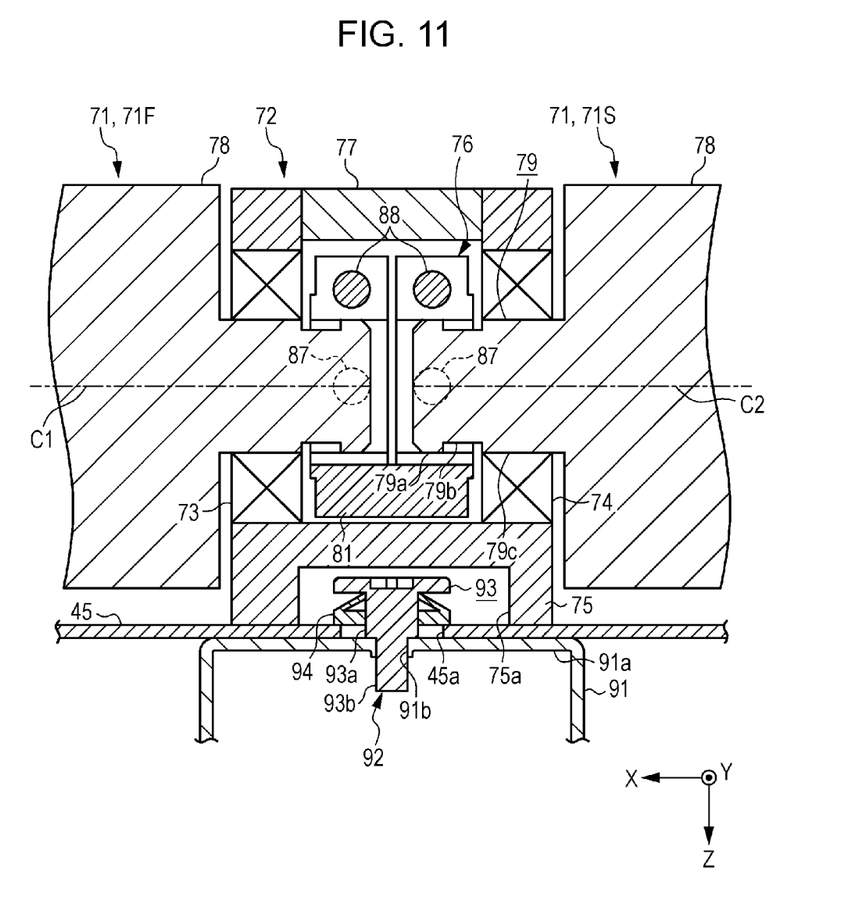
FIG. 11 is a sectional view of a transportation apparatus according to a second embodiment.

As illustrated in FIG. 11, the transportation apparatus 40 of the second embodiment includes a frame 91, which is the body frame of the apparatus, and a fastening mechanism 92 for fastening the frame 91 and the support table 45 together. The frame 91 has a wall portion 91a, which is in contact with the support table 45. A screw hole 91b is formed in a direction intersecting with (orthogonal to) the axial direction of the rollers 71 and the transportation direction Y of the medium M. On the other hand, a through hole 45a, the inside diameter of which is larger than that of the screw hole 91b, is formed in the support table 45 in the same direction as the direction in which the screw hole 91b is formed in the frame 91. A housing space 75a, inside which the fastening mechanism 92 is accommodated, is formed in the fixing member 75.

The fastening mechanism 92 includes a stepped screw 93, and a washer 94, which is used together with the stepped screw 93. The stepped screw 93 includes a pillar portion 93a, which has a columnar shape, and a male screw portion 93b. The outside diameter of the pillar portion 93a of the stepped screw 93 is larger than the inside diameter of the screw hole 91b of the frame 91, but is smaller than the inside diameter of the through hole 45a of the support table 45. The screw portion 93b of the stepped screw 93 can be driven into the screw hole 91b of the frame 91.

The inside diameter of the washer 94 is substantially equal to the outside diameter of the pillar portion 93a of the stepped screw 93. The outside diameter of the washer 94 is larger than the inside diameter of the through hole 45a of the support table 45. In the present embodiment, the washer 94 is a so-called wave washer.

As illustrated in FIG. 11, when the transportation apparatus 40 is assembled, the center of the through hole 45a of the support table 45 is aligned with the center of the screw hole 91b of the frame 91, and, in this state, the stepped screw 93 with the washer 94 mounted thereon is driven into the through hole 45a of the support table 45. In this way, the support table 45 is fixed to the frame 91 in a state of being sandwiched between the frame 91 and the washer 94.

In this sandwiched state, there is a clearance between the through hole 45a of the support table 45 and the pillar portion 93a of the stepped screw 93. Therefore, when a force is applied to the support table 45 in the axial direction of the rollers 71, the support table 45 is allowed to move in relation to the frame 91, the stepped screw 93, and the washer 94. The force required for the relative movement of the support table 45 is proportional to the fastening force of the stepped screw 93.

Next, the fixing member 75 is placed on the support table 45 in such a way as to accommodate the head of the stepped screw 93 in the housing space 75a. Next, the fixing member 75 is fixed to the support table 45. Though not illustrated in FIG. 11, the fixing member 75 is immovably fixed to the support table 45 by using a fastening means such as screws.

After that, as illustrated in the first embodiment, the shaft portions 79 of the two rollers 71 are connected together by means of the axial-hole-formed member 81, and the bearings 73 and 74 fixed to the fixing member 75. In this way, with the fastening mechanism 92 of the present embodiment, it is possible to fix the support table 45 and the fixing member 75 to the frame 91 while tolerating the movement of the support table 45 and the fixing member 75 in relation to the frame 91 in the axial direction of the rollers 71.

In the second embodiment, it is assumed that the one-end (right) shaft portion 79 of the roller 71 located at one end (right side) in the scan direction X (first roller 71) is supported immovably in the scan direction X as illustrated in FIG. 2.

Next, the operation of the printing apparatus 11 will now be explained. Some printers such as the printing apparatus 11 of the present embodiment are equipped with a heating device (an example of a heat source) for heating the medium M before and after printing for the purpose of accelerating the fixing of ink that has been ejected onto the medium M. In such a case, the support table 45 of the transportation apparatus 40 is heated due to the heating of the medium M by the heating device, and there is a risk that the heating might cause the thermal deformation of the support table 45. When the support table 45 deforms thermally (warps), the position of the fixing member 75, which is fixed to the support table 45, changes in the direction of gravity Z. There is a risk that this might cause the warping of the rollers 71 and/or might bring the axial center C1, C2 of rotation of two rollers arranged adjacent to each other out of alignment, resulting in a decrease in the transportation precision of the medium M.

Figure 12:
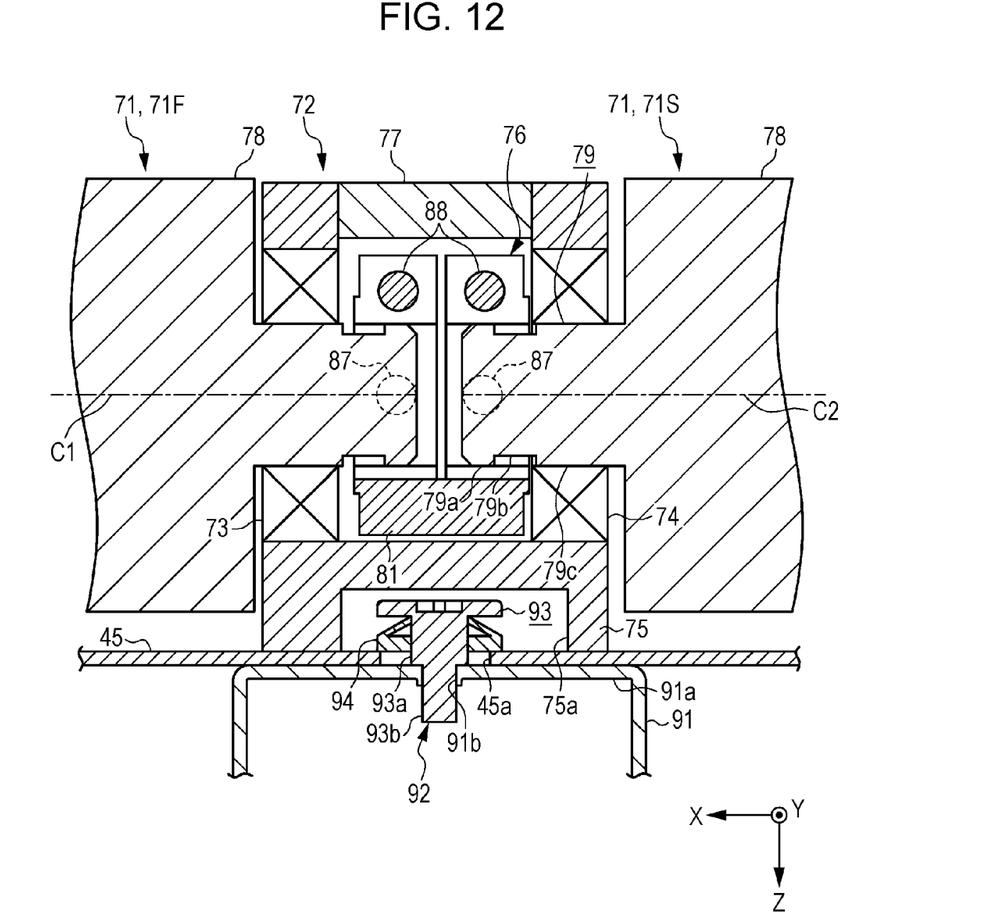
FIG. 12 is a sectional view for explaining the operation of the transportation apparatus of the second embodiment.

In this respect, in the present embodiment, the support table 45 is supported in such a way as to be able to move in the axial direction of the rollers 71 in relation to the frame 91 as illustrated in FIG. 12. Therefore, when a part of the support table 45 (the right portion in FIG. 12) is heated and when the heating causes thermal deformation, the support table 45 is allowed to move in the axial direction.

The fixing member 75, which is fixed to the support table 45, and the bearings 73 and 74, which are fixed to the fixing member 75, also move together with the support table 45. However, since the roller 71 located at one end in the scan direction X is supported immovably in the scan direction X, the movement of the support table 45 does not change the position of this roller 71 and the positions of the other rollers 71 connected in a line to this roller 71.

As described above, in the present embodiment, since there is a clearance that enables the support table 45 to move in the axial direction of the rollers 71 (clearance between the through hole 45a of the support table 45 and the pillar portion 93a of the stepped screw 93), it is possible to prevent the thermal warping of the support table 45. Consequently, it is possible to prevent a change in position of the fixing member 75 in the direction of gravity Z.

The second embodiment described above produces the following advantageous effect in addition to the effects of the first embodiment:

(6) The support table 45 is supported on the frame 91 in such a way as to be able to move in the axial direction of the rollers 71 in relation to the frame 91. Therefore, even if the support table 45 is heated by the heat source of the printing apparatus 11, it is possible to prevent the thermal warping of the support table 45 because the support table 45 can move in the axial direction of the rollers 71. For this reason, it is possible to prevent a change in position of the fixing member 75 in the direction of gravity Z due to the warping of the support table 45, and it is possible to prevent the warping of the rollers 71 supported indirectly by the fixing member 75 via the bearings 73 and 74.

The exemplary embodiments described above may be modified as described in variation examples below. The exemplary embodiments and the variation examples may be combined.

If the fastening force of the bolt 88 only is enough to prevent the relative movement of the shaft portion 79 in the circumferential direction in relation to the axial-hole-formed member 81, the first screw holes 85 and the screws 87 may be omitted. Alternatively, either one of the first screw holes 85A and 85B making up a pair, for example, the screw hole 85B only, may be formed, and the shaft portion 79 may be fixed by means of a single screw 87. For greater suppression of the relative movement of the shaft portion 79 in the circumferential direction in relation to the axial-hole-formed member 81, three or more first screw holes 85 may be formed, and the shaft portion 79 may be fixed by means of three or more screws 87 driven into the respective holes.

If the fastening force of the bolt 88 only is enough to make the axial hole 81a smaller by causing the flexural deformation of the axial-hole-formed member 81, it is not necessary to form the groove portion 81c in the axial-hole-formed member 81.

The transportation roller 46 consisting of plural rollers 71 connected together as in the foregoing embodiments is not limited to a roller that transports the medium M toward the printing unit 50. It may be embodied as a transportation roller provided at an arbitrary position, for example, a transportation roller in the ejection roller pair 42. However, among others, the transportation roller 46, which transports the medium M to the printing unit 50, must satisfy high transportation precision requirements so as not to give rise to print-position misregistration. Therefore, preferably, the transportation roller of the embodiments should be used.

In the second embodiment, the through hole 45a of the support table 45 should be elongated in the axial direction of the rollers 71. With this structure, it is possible to prevent the support table 45 from moving in the direction (transportation direction Y) orthogonal to the axial direction of the rollers 71 while tolerating the movement of the support table 45 in relation to the frame 91 in the axial direction of the rollers 71.

The printing apparatus 11 may be modified into a so-called full-line-type printing apparatus in which the printing unit 50 does not include the carriage 52 and includes an elongated fixed print head whose length corresponds to the entire width of the medium M. The print head in this variation example may have a print range throughout the entire width of the medium M by arranging plural unit head portions with nozzles adjacent to one another in a line, or a print range throughout the entire width of the medium M by arranging plural nozzles in a single elongated head throughout the entire width of the medium M.

The recording material used for printing is not limited to ink. It may be other fluid (including but not limited to liquid, a liquid material that is produced as a result of dispersion or mixture of particles of a functional material into/with liquid, a gel fluid or the like, a solid substance that can be ejected as a fluid). For example, it may be applied to a structure in which recording is performed by ejecting a fluid that contains a dispersed or dissolved material such as a color material (pixel material) or an electrode material used in the manufacturing of a liquid crystal display, an electroluminescence (EL) display, a surface emission display, or the like.

The printing apparatus may be a fluid ejection apparatus that ejects a fluid such as gel (e.g., physical gel), or a powder/particle ejection apparatus that ejects a powdery solid matter, for example, toner powder (particles) (e.g., toner-jet recording apparatus). In the description of this specification, the term "fluid" is defined as a broad generic concept that encompasses a variety of fluid substance excluding "gas-only" fluid. For example, the fluid includes but not limited to liquid (including, inorganic solvent, organic solvent, solution, liquid resin, liquid metal (metal melt)), a liquid substance, a fluid substance, and a particulate substance (including, particles and powder).

The printing apparatus 11 is not limited to a printer that performs recording by ejecting a fluid such as ink. For example, it may be a non-impact printer such as a laser printer, an LED printer, a thermal transfer printer (including a sublimation printer), or an impact printer such as a dot-impact printer.

The medium is not limited to paper. It may be a plastic film or a thin plate, etc. It may be textile used in a textile printing apparatus, etc.

The transportation apparatus 40 provided with the transportation roller 46 is not limited to the above-described device mounted on the printing apparatus 11. For example, it may be mounted on a scanner that scans the medium M transported, a facsimile, a copier, or a multi-function machine that is a mixture of them.

This application claims priority under 35 U.S.C. § 119 to Japanese Patent Application No. 2015-053039, filed Mar. 17, 2015 and No. 2015-174439, filed Sep. 4, 2015. The entire disclosure of Japanese Patent Application No. 2015-053039 and No. 2015-174439 are hereby incorporated herein by reference.

What is claimed is:

1. A transportation apparatus, comprising:
a transportation roller used for transporting a medium and includes plural rollers arranged in a rotation axis direction and a coupling portion for coupling an end portion of one of, among the plural rollers, two arranged adjacent to each other in the rotation axis direction to an end portion of the other, the adjacent two being defined as a first roller and a second roller, the coupling portion including,
a first bearing that supports the end portion of the first roller rotatably;
a second bearing that supports the end portion of the second roller rotatably;
a fixing member to which the first bearing and the second bearing are fixed; and
a joint portion provided between the first bearing and the second bearing in the rotation axis direction for connecting the end portion of the first roller to the end portion of the second roller.

2. The transportation apparatus according to claim 1, wherein the roller has a shaft portion located at its end in the rotation axis direction; and
wherein the joint portion can connect the shaft portion of the first roller and the shaft portion of the second roller together in a state in which deviation of the axial center of rotation of the shaft portion with respect to the axial center of the first bearing and the second bearing is tolerated.

3. The transportation apparatus according to claim 1, wherein the roller has a shaft portion located at its end in the rotation axis direction; and
wherein the shaft portion includes a large diameter portion that is able to be in contact with the joint portion when connected by the joint portion, and a small diameter portion, outside diameter of which is smaller than that of the large diameter portion.

4. The transportation apparatus according to claim 1, wherein the joint portion includes a cylindrical axial-hole-formed member that has an axial hole formed inside its inner cylindrical surface;
wherein the axial-hole-formed member has a slit, first screw holes, and a second screw hole;
wherein the slit is formed through a cylindrical portion in communication with the axial hole and extends in the rotation axis direction;
wherein the first screw holes making up a pair are formed in the cylindrical portion in such a way as to face each other, with the axial hole located therebetween, and extend in a direction intersecting with the rotation axis direction;
wherein the second screw hole is formed at a position closer to the slit than the first screw holes are;
wherein diameter of the axial hole can be reduced by tightening a bolt screw-driven into the second screw hole; and
wherein two screws driven into the respective first screw holes can be protruded into the axial hole.

5. A printing apparatus, comprising:
the transportation apparatus according to claim 1; and
a printing unit that performs printing on the medium transported by the transportation apparatus according to claim 1.

6. A printing apparatus, comprising:
the transportation apparatus according to claim 2; and
a printing unit that performs printing on the medium transported by the transportation apparatus according to claim 2.

7. A printing apparatus, comprising:
the transportation apparatus according to claim 3; and
a printing unit that performs printing on the medium transported by the transportation apparatus according to claim 3.

8. A printing apparatus, comprising:
the transportation apparatus according to claim 4; and
a printing unit that performs printing on the medium transported by the transportation apparatus according to claim 4.

* * * * *